United States Patent [19]

Herman

[11] 4,108,229
[45] Aug. 22, 1978

[54] TRACTION ELEMENT FOR REMOVABLE TRACK

[75] Inventor: Eugene T. Herman, Saint Marys, Ohio

[73] Assignee: The Goodyear Tire & Rubber Company, Akron, Ohio

[21] Appl. No.: 646,433

[22] Filed: Jan. 5, 1976

[51] Int. Cl.² .............................................. B60C 11/00
[52] U.S. Cl. ................................. 152/175; 152/209 R; 305/13
[58] Field of Search ................. 305/13, 19, 35 EB, 54, 305/55, 38, 60, 39–43, 53; 152/209 D, 209 B, 290, 173, 209 R, 175; 301/40 R; D12/138, 154, 149–151, 145, 142, 136

[56] References Cited

U.S. PATENT DOCUMENTS

| 1,116,503 | 11/1914 | Shaver | 152/290 X |
| 3,857,617 | 12/1974 | Grawey | 305/38 |
| 3,899,220 | 8/1975 | Grawey et al. | 305/19 |

FOREIGN PATENT DOCUMENTS 1,809,540  8/1969  Fed. Rep. of Germany ....... 152/209 B Primary Examiner—Robert B. Reeves
Assistant Examiner—John P. Shannon
Attorney, Agent, or Firm—Frederick K. Lacher; R. P. Yaist

[57] ABSTRACT

A removable track for an annular resilient tire having a plurality of shoes mounted on a belt at spaced-apart positions along the belt. Each of the shoes has groups of raised traction bars on the ground-engaging surface at spaced-apart positions transversely of the belt. Each of the groups of traction bars has at least two bars positioned at an acute angle to the leading and trailing edges. The groups may have two pairs of bars with supplementary bars between groups and at the ends providing continuations of the traction surfaces of the traction bars on adjacent shoes. Slots between the ends of the traction bars may also be provided for movement of soil out of the spaces between bars upon deflection and articulation of the shoes in operation.

4 Claims, 4 Drawing Figures

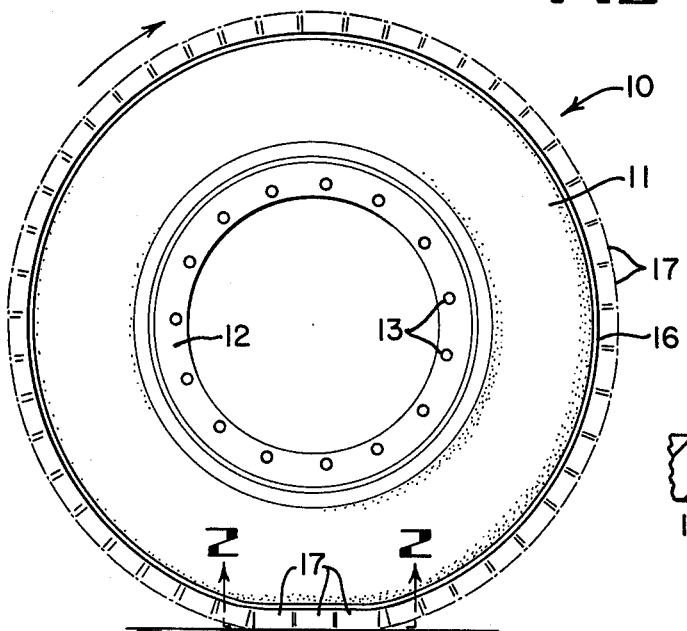
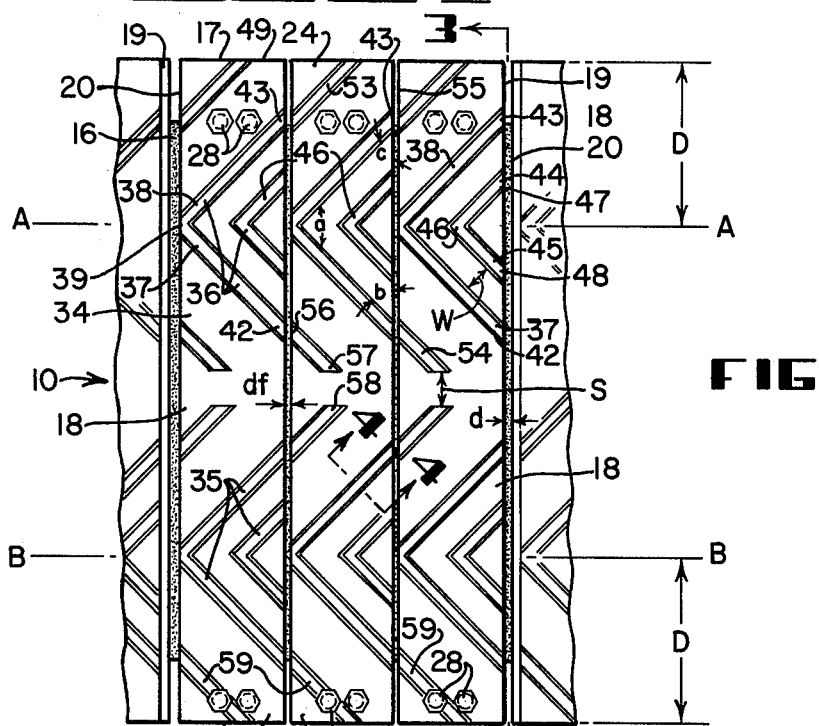
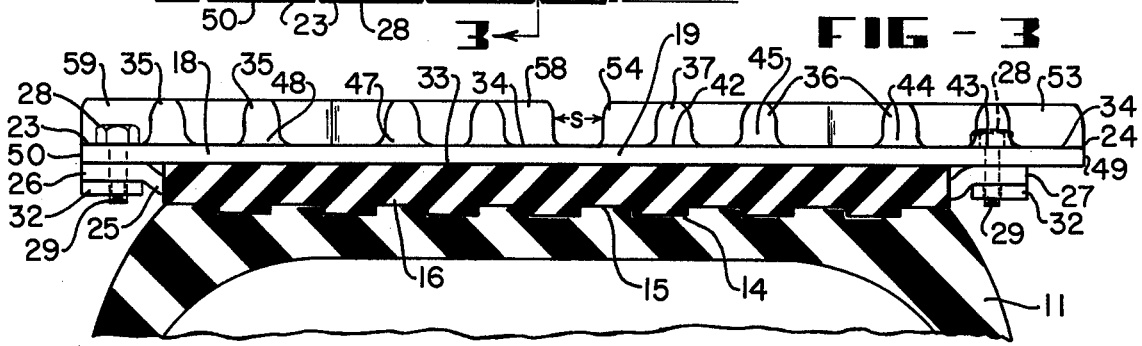

TRACTION ELEMENT FOR REMOVABLE TRACK

This invention relates generally, as indicated, to a track for an annular resilient tire. The track has an annular flexible belt which is mounted about the outer circumference of an annular resilient tire. A plurality of wear-resisting shoes of steel or other wear-resisting material are fastened to the belt providing a traction surface which has satisfactory wear-resisting properties for operation in environments where the ground surface contains rock or other highly abrasive material.

Heretofore, the shoes of the track have had traction ribs; however, the positioning of the ribs and the number of ribs has been determined by the size of the shoes. For example, the ribs have extended transversely across the belt from one end of a shoe to the other. In some cases, the ribs have been straight and in other cases they have been bent in an effort to provide better traction in the forward, reverse and lateral directions. Because the shoes and traction ribs are of substantially rigid, wear-resisting material, they do not flex and eject the dirt from between the ribs as do conventional tire treads of resilient, flexible material. Accordingly, even though during operation in the loaded condition, the tire and belt deflect and there is relative movement between the shoes, problems have been had with soil lodging between the ribs on the shoes and consequently adversely affecting the traction efficiency of the shoes used heretofore. In order to reduce the tendency of the soil to lodge between the ribs, the number of ribs has been reduced and this has further adversely affected the traction efficiency of the track.

It has been found that shoes with ribs suitable for crawler tracks have not been suitable for removable tracks for tires because the length of the footprint or ground-engaging surface of the removable track is relatively short as compared to the footprint of the crawler track. Since slip is a function of the footprint length, shoes suitable for crawler tracks where a number of the shoes may be clogged with soil between the ribs still provide sufficient traction. However, in a removable track for a tire where only about three shoes are in contact with the ground, the same amount of clogging reduces the traction efficiency to the point where the tire may spin. The reduced footprint length of the removable track is compensated for to some extent by the greater relative movement of the shoes which are clamped to a belt as compared to the mechanically limited relative movement of the shoes of a crawler track.

With the foregoing in mind, it is the principal object of this invention to provide a track with each of the shoes having traction ribs positioned for maximum traction with a minimum of clogging of soil between the bars.

Another object is to provide groups of traction bars on each of the shoes positioned for maximum traction.

Still another object of the invention is to provide groups of traction bars with more than one pair of angularly disposed bars in each group positioned for maximum traction.

A still further object of this invention is to provide supplementary traction bars on adjacent shoes for extending the traction surface of the bars in each group.

Another object of the invention is to provide slots between the ends of converging supplementary traction bars for the passage of soil to reduce clogging of the space between the bars.

A further object of the invention is to provide traction bars at the unsupported ends of the shoes for reinforcing the end portions.

These and other objects of the present invention may be achieved by a track in which the shoes have groups of ribs positioned at spaced-apart locations transversely of the track belt with pairs of the bars positioned at an angle to the leading and trailing edges of the shoes.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative however, of but one of the various ways in which the principles of the invention may be employed.

In the annexed drawings:

FIG. 1 is a schematic elevation of a track mounted on a resilient tire shown in the loaded condition.

FIG. 2 is an enlarged fragmentary view taken along the plane of line 2—2 in FIG. 1 showing the footprint of the removable track.

FIG. 3 is a further enlarged fragmentary sectional view taken along the plane of line 3—3 in FIG. 2.

FIG. 4 is a still further enlarged fragmentary sectional view taken along the plane of line 4—4 in FIG. 2 showing the rib configuration.

Referring to FIG. 1, a removable track 10 is shown mounted on an annular, resilient tire 11 which in turn may be mounted on a rim 12 for bolting to a wheel (not shown) by means of bolt holes 13 in the rim. The tire 11 may be of rubber and other rubberlike material reinforced with plies of cords (not shown) which may be of steel, textile fibers or other suitable material. The tire 11 may also have bead portions at the inner periphery containing annular beads of steel or other nonextensible material for mounting of the tire on the rim 12. The tire 11 may also be inflatable with air or other suitable fluid through a valve (not shown).

As shown more clearly in FIG. 3, the tire 11 has a grooved surface 14 for mating engagement with a matching grooved surface 15 of a belt 16 of the track 10. The belt 16 is a flexible, cylindrical body of rubber or other rubberlike material reinforced by circumferential, substantially inextensible members such as steel wire (not shown). Traction shoes 17 are fastened to the belt 16 at spaced-apart positions along the belt. Each of the shoes 17 includes a substantially rigid, elongated plate 18 of steel or other wear-resisting material having a trailing edge 19 and a leading edge 10. In the embodiment shown, the plate 18 is rectangular with the trailing edge 19 parallel to the leading edge 10. The plate 18 of each of the traction shoes 17 also has end portions 23 and 24 for fastening to mounting plates 25 which may be molded in the belt 16 and have offset end flanges 26 and 27 in engagement with the end portions 23 and 24, respectively, of the plate for each of the traction shoes. Fasteners such as bolts 28 extend through holes in the end portions 23 and 24 of the plate 18 of each of the traction shoes 17 and through corresponding holes in the end flanges 26 and 27 of the mounting plates 25 at mounting positions on the traction shoes. The threaded ends 29 of the bolts 28 are in threaded engagement with threaded holes in retainer blocks 32 located under the end flanges 26 and 27 of the mounting plates 25 for clamping the plate 18 of each of the traction shoes 17 to the belt 16. The plate 18 has a belt-engaging surface 33 and a ground-engaging surface 34 as shown in FIG. 3.

As shown more clearly in FIGS. 2 and 3, each of the traction shoes 17 has groups 35 and 36 of raised traction bars mounted on the plate 18 at the ground-engaging surface 34. The groups 35 and 36 are positioned at spaced-apart positions transversely of the belt 16. The following description of the traction bars in the groups 35 and 36 will be confined to the bars of group 36; however, since the positioning of the bars of group 35 is the same as the positioning of the bars of group 36, only one group will be described.

Group 36 includes a pair of traction bars 37, 38 extending from a single position 39 on the leading edge 20 to spaced-apart positions 42 and 43 at the trailing edge 19. The traction bar 37 is positioned at an angle (b) to the trailing edge of from 30° to 60° and the traction bar 38 is positioned at an angle (c) of from 30° to 60° to the trailing edge. The traction bars 37 and 38 are positioned at an angle (a) of from 60° to 120° to each other. In the preferred embodiment, angle (a) is 90° and angles (b) and (c) are 45°. The traction bars 37 and 38 will be positioned at the same angle to the leading edge 20 as angles (b) and (c) to the trailing edge 19 since the leading edge and trailing edge are parallel.

A second pair of traction bars 44 and 45 extend from an intermediate position 46 between the trailing edge 19 and leading edge 20 to a second pair of spacedapart positions 47 and 48 at the trailing edge. Traction bar 44 is parallel to traction bar 38 of the first pair of traction bars and traction bar 45 is parallel to traction bar 37 of the first pair of traction bars. Also traction bars 44 and 45 of the second pair are spaced from traction bars 37 and 38 a distance W which in the preferred embodiment is approximately 2 inches.

With reference to FIG. 4, the traction bars including traction bar 38 have a height H which in the preferred embodiment is approximately 1-3/4 inches. Preferably the distance W between the traction bars 44 and 45 of the second pair of traction bars and 37 and 38 of the first pair is greater than the height H of the bars for traction bars of this type.

As shown in FIG. 2, the traction bars 37, 38 and 44, 45 of the first and second pairs are symmetrical about a longitudinal line A—A whereas the corresponding traction bars of the other group of traction bars 35 are symetrical about a longitudinal line B—B. The lines A—A and B—B are spaced the same distance D from end edges 49 and 50 of the plate 18 of the traction shoes 17 and therefore the groups 35 and 36 of traction bars are positioned equidistant from the end edges.

Supplementary raised end bars 53 and center bars 54 are positioned on the ground-engaging surface 34 with relation to the first pair of traction bars 37 and 38 in the same manner as corresponding, supplementary bars for group 35. Therefore, the following description will be confined to supplementary end bars 53 and center bars 54 with the understanding that this description also applies to the supplementary bars positioned in cooperative relationship with the traction bars of group 35. Each of the end bars 53 extends from a position 55 on the leading edge 20 which is spaced the same distance from the end edge 49 as the position 43 on the trailing edge 19 of the plate 18. The end bars 53 are parallel to the traction bars 38 of the first group of traction bars.

Each of the center bars 54 for each of the traction shoes extends from a position 56 on the leading edge 20 of the plate 18 which is spaced the same distance from the end edge 49 as position 42 on the trailing edge 19 and is parallel to traction bars 37. The center bars 54 of each of the traction shoes 17 extend to a position 57 spaced a distance S from corresponding center bars 58 positioned in cooperative relationship with the group 35 of traction bars, as shown in FIG. 2. Preferably the distance S between the center bars 54 and 58 is greater than the height H of the traction bars for traction bars of this type. In the preferred embodiment shown, the distance S is approximately 2 inches.

As shown in FIG. 3, the end bars 53 extend from mounting positions at the end flange 27 of the mounting plate 25 to the end edges 49 of the traction shoes 17 to reinforce the unsupported end portions of the traction shoes. End bars 59 positioned in cooperation with the traction bars of group 35 also extend from the mounting position at the end flanges 26 of the mounting plates 25 to the end edges 50 of the traction shoes 17 to reinforce the unsupported end portions.

The traction shoes 17 are of a wear-resistant material such as forged or cast steel. As shown in FIG. 4, each of the traction bars of groups 35 and 36, end bars 53, 59 and center bars 54, 58 has a crest 60 which may be flame-hardened to increase the wear resistance of the material. Also, sides 62 and 63 have a smooth finish so that soil may move along the ribs without clogging the space between the ribs.

In operation, the track 10 is mounted on the tire 11 for rotation in the direction shown by the arrow in FIG. 1. In the loaded condition, the tire is deflected as shown in FIG. 1 and this causes the belt 16 to be deflected whereupon the traction shoes 17 engaging the ground are articulated to form a footprint as shown in FIG. 2. Distance (d) measured between the radially outer surfaces of the traction bars at the leading edge 20 and trailing edge 19 of each of the shoes is reduced to a dimension (df) as shown in FIG. 2. In the present embodiment, the normal distance (d) between the shoes is reduced from approximately one-fourth inch to one-eighth inch in the footprint. In this footprint configuration shown in FIG. 2, it can be seen that the inclined traction bars of groups 35 and 36 provide lateral stability as well as traction.

The distance between the bars 37 and 38 of the first pair and the bars 44 and 45 of the second pair is sufficient to prevent clogging with soil while at the same time provides the necessary traction and lateral stability. These traction surfaces are supplemented by the center bars 54 and 58 and by the end bars 53 and 59. As the traction shoes 17 roll past the footprint area, the distance (df) between the shoes will increase to the distance (d) and this fluctuation will serve to unclog the spaces between the traction ribs. This action is further supplemented by the change in radius of the shoes and the resiliency of the tire 11 which will tend to open and close the gap between the shoes 17 as the tire 11 and track 10 roll over uneven ground.

In the present embodiment, the traction shoes 17 have a width from trailing edge 19 to leading edge 20 of approximately 7 inches and a length measured transversely of the belt of around 44 inches. Where it is desirable to have a greater transverse length but the width cannot be increased, additional groups of traction bars may be added at transversely spaced-apart positions along the traction shoes 17. In the same manner, if the diameter of the tire 11 and track 10 is reduced and the width of the traction shoes 17 must be reduced, this change in dimension can be accomodated without loss of traction and cleaning by utilizing three or more groups of traction bars in accordance with this invention as set forth above.

While a certain representative embodiment and details has been shown for the purpose of illustrating the invention, it will be apparent to those skilled in the art that various changes and other modifications may be made therein without departing from the invention.

What is claimed is:

1. A track for an annular resilient tire comprising a flexible belt, a plurality of substantially rigid elongated shoes extending transversely of said belt and being mounted on said belt at spaced-apart positions along said belt, each of said shoes having a belt-engaging surface, a ground-engaging surface, a leading edge, a trailing edge and end edges, substantially rigid raised traction bars on said ground-engaging surface, all of said bars being in groups at spaced-apart positions transversely of said belt on said ground-engaging surface or being supplementary separate traction bars, each of said groups having a pair of bars positioned at acute angles to said leading and trailing edges with said pair of bars extending from first spaced-apart positions on said ground-engaging surface at said trailing edge to a single position on said ground-engaging surface at said leading edge, each of said groups having a second pair of traction bars in substantially parallel relationship to said pair of traction bars and extending from spaced-apart positions on said trailing edge located between said first-mentioned spaced-apart positions on said trailing edge to an intermediate position between said leading and trailing edges and said supplementary traction bars extending from said leading edge and in substantial alignment with at least some of said bars of said groups so that the spaces between all of said bars are open at said trailing edge for passage of earth and cleaning of said shoes during operation.

2. A track in accordance with claim 1 wherein said trailing edge of one of said shoes is parallel to and spaced from said leading edge of an adjacent one of said shoes.

3. A track in accordance with claim 2 wherein said supplementary traction bars include a center pair of traction bars extending from spaced-apart positions on said leading edge towards a position equidistant from said end edges of said shoe.

4. A track in accordance with claim 2 wherein said supplementary traction bars include end bars extending from spaced-apart positions on said leading edge to positions on said end edges of said shoe.

* * * * *